United States Patent [19]

Voelker

[11] Patent Number: 4,979,682

[45] Date of Patent: Dec. 25, 1990

[54] RECLAIMING SYNTHETIC

[75] Inventor: Martin Voelker, Langenhagen, Fed. Rep. of Germany

[73] Assignee: Kabelmetal Electro GmbH, Hanover, Fed. Rep. of Germany

[21] Appl. No.: 314,810

[22] Filed: Feb. 24, 1989

[30] Foreign Application Priority Data

Feb. 25, 1988 [DE] Fed. Rep. of Germany ....... 3805875

[51] Int. Cl.$^5$ ............................................. B02C 23/24
[52] U.S. Cl. ....................................... 241/19; 241/22; 241/29; 241/DIG. 38
[58] Field of Search ........................ 241/14, 19, 24, 29, 241/DIG. 38, 5, 39, 40, 57, 15, 22; 264/37

[56] References Cited

U.S. PATENT DOCUMENTS 3,749,322 7/1973 Reynolds ............................... 241/24

FOREIGN PATENT DOCUMENTS

| 1924640 | 11/1970 | Fed. Rep. of Germany . |
| 2101739 | 7/1972 | Fed. Rep. of Germany . |
| 2347108 | 3/1975 | Fed. Rep. of Germany . |
| 3039870 | 11/1985 | Fed. Rep. of Germany . |
| 3422924 | 12/1985 | Fed. Rep. of Germany . |

Primary Examiner—Mark Rosenbaum
Attorney, Agent, or Firm—Ralf H. Siegemund

[57] ABSTRACT

Synthetic and metal are reclaimed from a synthetic-metal scrap combination by first comminuting the scrap particles in which metal and synthetic are not yet separated; grinding and pulverizing these particles to obtain a fluidized blend of synthetic fibers and metal spheres; and providing an air flow carrying the fibers and balls in a blend so as to obtain subsequent separation from each other.

6 Claims, 1 Drawing Sheet

RECLAIMING SYNTHETIC

BACKGROUND OF THE INVENTION

The present invention relates to the reclaiming of synthetic material for metal and/or synthetic waste. Specifically the present invention relates to such a method as well as to equipment for the recovery of synthetic material from waste so that the recovered material is substantially metalfree particularly from a blend of synthetic material and metal such as the waste resulting in cable manufacture. The invention moreover refers to the preparation of the reclaimed synthetic and/or metal material of easy re-use.

Reclaiming this or that product is generally known and many proposals have been made along that line with particular emphasis on the problem resulting from the fact that the waste or scrap material is a blend, so to speak, of many different kinds of material and different components; with emphasis in the past on reclaiming of any metal. German printed patent application 21 01 739 has proposed to expose the scrap or waste to low temperatures so that any synthetic material cover or coating is made very brittle following which it is fairly easy to remove the synthetic material from the metal, the brittle plastic just crumbles even if originally it firmly adhered to a conductor on which it was deposited. Of course it can readily be seen that the cooling is an energy extensive process and is in fact generally expensive. Still metal is sufficiently valuable to undergo the expenses in many instances while on the other hand the synthetic material is not reclaimed.

German printed patent application 23 47 108 is directed to a basically similar method but with different execution. The metal synthetic blend or compound parts are cooled also here, but subsequently subjected to ultrasonic vibration or magnetic vibration so as to separate metal from synthetic. The synthetic is not reclaimed here.

German printed patent 30 39 870 refers to the reclaiming of components from a compound structure that includes rubber and metal. Rather than cooling the raw charges this patent proposes annealing particularly of the metal part whereby the rubber decomposes. Obviously the rubber following such excessive heat treatment cannot be reused. The same is true for a similar method as per German printed patent application 34 22 942 wherein such a compound body is exposed to hot vapor of a solvent which provides the solving of the synthetic and/or rubber from metal substrate.

Another method for separating metal wires from the insulation is disclosed in German printed patent application 19 24 640 and provides for a plural step mechanical cutting of the wire and the cut blend of wire pieces and other materials are then subjected to a multistage electrostatic processing. Heavier components are separated through a weak air current from lighter ones. The resulting metal granulate is collected and reused.

It can readily be seen that in all these methods and in this known practice emphasis is on the reclaiming of metal, on freeing the metal from other parts such as synthetic and rubber, and no interest had been voiced to reclaim also the synthetic and/or rubber. Often and for one reason or another this seems to be impossible.

DESCRIPTION OF THE INVENTION

It is an object of the present invention to provide a new and improved method for reclaiming synthetic generally such that the reclaimed material can be passed onto a manufacturing process without posing any problems.

It is another object of the present invention to provide a new and improved method and equipment for reclaiming both metal and synthetic in a common process without dispersing with either.

In accordance with the preferred embodiment of the present invention it is suggested to comminute and grind waste into small pieces, sections or the like and to finally grind them into a pourable blend of metal balls and synthetic fibers. Subsequently the fibers are separated from balls in an air-current or flow separation process. The secondary or fine grinding as stated will in fact lead to very fine synthetic fibers while the metal is formed into small spheres or balls. This is more or less inherent in the grinding process and the result of the reaction of this particular blend of pre-ground wire scrap to the grinding tools. As a consequence whatever results is a blend of fibers, balls whereby on one hand the little synthetic fibers have very low weight but often relatively large flow resistance to air currents; on the other hand metal balls owing to their spherical contour have a low resistance against air current while being comparatively heavy. Now, owing to these specific properties air current and inertia-weight separation is readily obtainable to thereby separate the metal from the synthetic without having to dispense with either. One can in fact, and in such a simple fashion, separate the synthetic from the metal such that the accumulated synthetic fibers will contain less than 0.1% metal residue. Therefore this particular heap of synthetic fibers can be deemed to be substantially metalfree while on the other hand the metal balls contain very few fibers so that either can then be processed separately in a convenient fashion.

The inventive method can be carried out step by step as indicated but it was found to provide a kind of combining of steps. In particular it was found advantageous to let the separation of fibers from metal balls directly and immediately following the fine grinding in one particular step. It was found that this is cost-effective and otherwise technically practical. Fine grinding the metal plus synthetic scrap such that pourable blend obtains, is preferably carried out with a high throughput of air to obtain by so called impact separation in an impact pulverization. The individual parts to be ground are in fact subjected to strong turbulent flow and hit each other often and thereby continue the cutting process. Subsequently, in the same air flow, dynamic separation obtains of the metal spheres or globules from the feathery synthetic.

The method in accordance with the invention does not only provide for the separate reclaiming of both, synthetic and metal from scrap, but an immediate processing of the synthetic can follow, in that the reuse follows directly the reclaiming. Preferably this obtains in the following manner. The fine grinding and pulverizing process outlined above may be carried out under adding certain materials such as chalk, soot, dye pigments or even certain raw polymers simply with the goal in mind of what the final properties of the reused and reclaimed material is going to be. Here the reuse overlaps the reclaiming. Adding these materials during grinding establishes a very favorable distribution and intimate blend of the additives to the synthetic. The fact that metal is present at that time actually enhances the homogeneity of distribution. The additives can be accurately metered and, therefore, one can use comparatively expensive additives because surprisingly the accuracy leads to a minimum of waste in additives.

In order to practice the invention in an economic fashion it is suggested that the sections or pieces to be (coarse) ground in pieces are provided on a continuous basis from a supply and at that feed rate they are coarse ground and fine ground grind pulverized. If a direct use of the powder following grinding is not desired then the pourable metal/synthetic blend may be stored; it may be necessary for one reason or another to dry it. Following drying process and depending on the particular kind of material involved there may then follow directly a separation of the metal from the synthetic. Finally the air current which is the basic separating medium for the synthetic from the metal is passed through a filter to eliminate therefrom whatever synthetic particles are still carried along.

The inventive method is practiced with advantage through feeder devices with downstream precipitator. The feeder device directly receives the fluidized metal - synthetic blend carried along from the pulverizer and grinding mill by means of the air current. The subsequent separation filters metal components out of the air stream and subsequent separation involves the filtering of the synthetic from the air stream.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
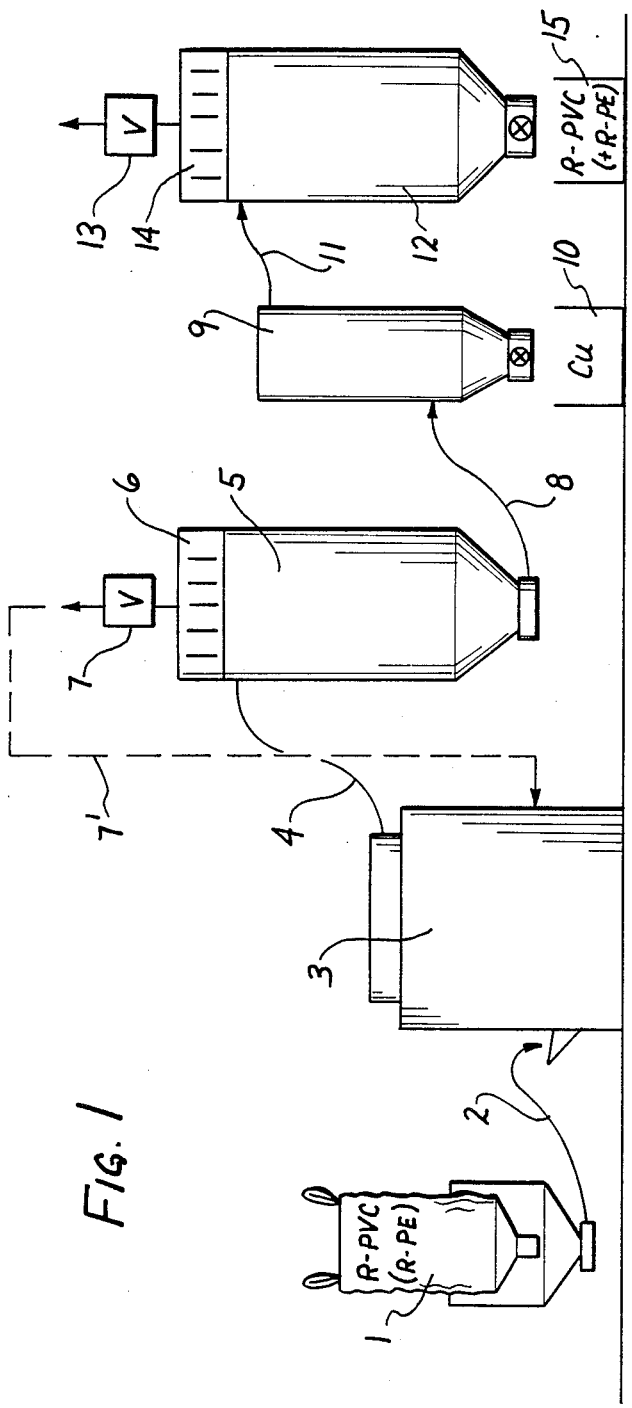
FIG. 1 is a schematic showing of equipment for practicing the preferred embodiment of the present invention in the best mode configuration.

Proceeding now to the detailed description of the drawings, it is assumed that cable scrap is to be processed with the goal in mind to separate metal from synthetic and vice versa without dispensing with either. Basically a two step process is envisioned. The scrap is coarsely ground and comminuted into relatively small parts but not into a fluidized version and is passed into the feeder device 1. The ground scrap pieces as discharged from feeder device 1 are transferred through a spiral tube 2 to a grinding and pulverizing mill 3. The mill provides a grinding operation through a high throughput of air by means of which grinding air undergoes excessive high turbulence and as the particles are carried along one obtains a large number of impacts/time among the particles themselves as carried along as well as through impacts against stationary and rotating mill components. These frequent impacts in fact deform the little particles into smaller ones and establish basically synthetic fibers and small metal balls or spheres. The high air throughput makes sure that no undue heating occurs which is important not only for avoiding decomposition of the synthetic, but the synthetic particles should not even be heated to a (often rather low) softening point so that they may weld together.

The air flow for the pulverizing and grinding process serves as a transport flow which carries along the synthetic-metal blend as a fluidized turbulent bed and feeds same through conduits through a precipitator 5. The precipitation of the solid particles obtains through filter 6 which is passed through by this air flow. There is a return pass (7') through an exit 7 to feed air back into the mill 3.

The continuously supplied synthetic-metal blend as obtained in the precipitator 5 is now fed through a connecting conduit 8 to a separating column 9. This column includes one or several wheel air flow separators. The principle of operation is that the air flow with the blend it carries is fed from below into the column 9 and passes the wheel therein in a direction from out towards in i.e. with basically radially inwardly oriented flow component and thereby the fine parts, namely the synthetic material fibers are carried along and separated. From the metal spheres because the latter will be deflected from this wheel and will fall to the bottom and discharged from and through the container 10. In lieu of one or plural wheel separators one can use other structures for separating fibrous, synthetic particles from metal balls.

The conduit 11 provides a flow for the fibrous synthetic as air flow into the precipitators 12; the air will discharge through outlet 13 and can be recycled through the precipitator 5. The synthetic particles are trapped by the filter 14 and actually fall through the bottom of the column 12 and into a container 15.

If as may be provided in accordance with the invention filler material is to be added for obtaining already, in the separation process, a blend of synthetic material plus filler material or other polymer material, these additives are simply fed in suitable form to the grinder 3 and are carried along in the process. The separation of the heavy metal particles is not interfered with and the filler must not have a configuration that it be carried along with the metal balls. It can readily be seen that the inventive method can be practiced in a cascaded fashion to provide multistage separation.

The invention is not limited to the embodiments described above but all changes and modifications thereof, not constituting departures from the spirit and scope of the invention, are intended to be included.

I claim:

1. Method for reclaiming synthetic material from a synthetic-metal scrap combination, comprising the steps of:
   providing finely divided scrap particles in which metal and synthetic are not yet separated;
   grinding and pulverizing these particles through impacts in a highly turbulent airflow to obtain a fluidized blend of synthetic fibers and metal balls respectively out of insulation as removed from the metal, and of the remaining metal scrap itself; and
   providing an air flow carrying the synthetic fibers and metal balls in the blend so as to obtain subsequent separation from each other.

2. Method as in claim 1 and including the step of adding a synthetic material to the blend prior to grinding.

3. Method as in claim 1 and including the step of adding filler materials to the blend prior to grinding.

4. Method as in claim 1 and including drying the synthetic material following separation from metal prior to reuse.

5. Method as in claim 1 wherein the grinding and pulverizing step and the air flow separating step are one continuing step.

6. Method as in claim 1 wherein a drying step is interposed between the pulverizing and the separation.

* * * * *